United States Patent [19]
Farley

[11] 3,956,674
[45] May 11, 1976

[54] ELECTRIC FURNACE WITH INTERLOCKING DISCONNECT PANEL FOR ELECTRIC BOX

[75] Inventor: Ray Scott Farley, Wichita, Kans.
[73] Assignee: The Coleman Company, Inc., Wichita, Kans.
[22] Filed: Oct. 11, 1974
[21] Appl. No.: 513,953

[52] U.S. Cl............................ 317/114; 126/110 R; 200/50 A; 200/51.09; 219/369
[51] Int. Cl.².......................................... H02B 1/10
[58] Field of Search........ 126/110 R, 116 R, 116 A; 174/52 R; 317/112, 114, 116, 120; 219/364, 366, 369, 374; 200/51.09, 50 R, 50 A, 50 B, 61.62, 61.72, 163, 334, 329; 339/39, 40, 42

[56] References Cited
UNITED STATES PATENTS

| | | | |
|---|---|---|---|
| 2,592,396 | 4/1952 | Dahlstrom | 126/116 R |
| 2,656,425 | 10/1953 | Satinoff | 200/50 A |
| 3,323,509 | 6/1967 | Harbin | 126/110 R |
| 3,868,160 | 2/1975 | Kersman | 200/51.09 |

*Primary Examiner*—Gerald P. Tolin
*Attorney, Agent, or Firm*—Dawson, Tilton, Fallon & Lungmus

[57] ABSTRACT

A forced-air electric furnace is provided with an electric disconnect block mounted within a recess in the furnace body forming an electric box. The electric box is closed by a cover panel which includes an aperture through which a disconnect block extends to establish electrical continuity between the feed-in wires and the furnace heater coils. The plug has side shoulder areas which extend beyond the aperture in the cover panel to prevent uncovering the box without disconnecting the electricity.

6 Claims, 6 Drawing Figures

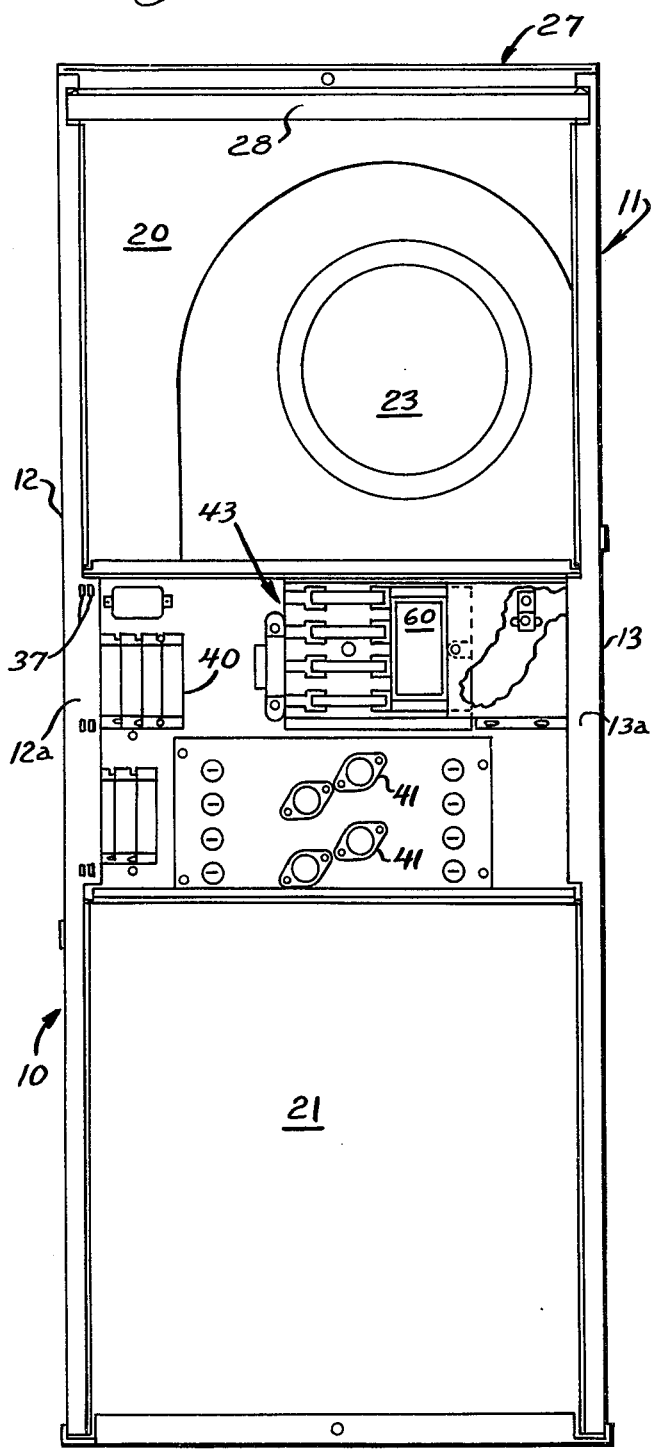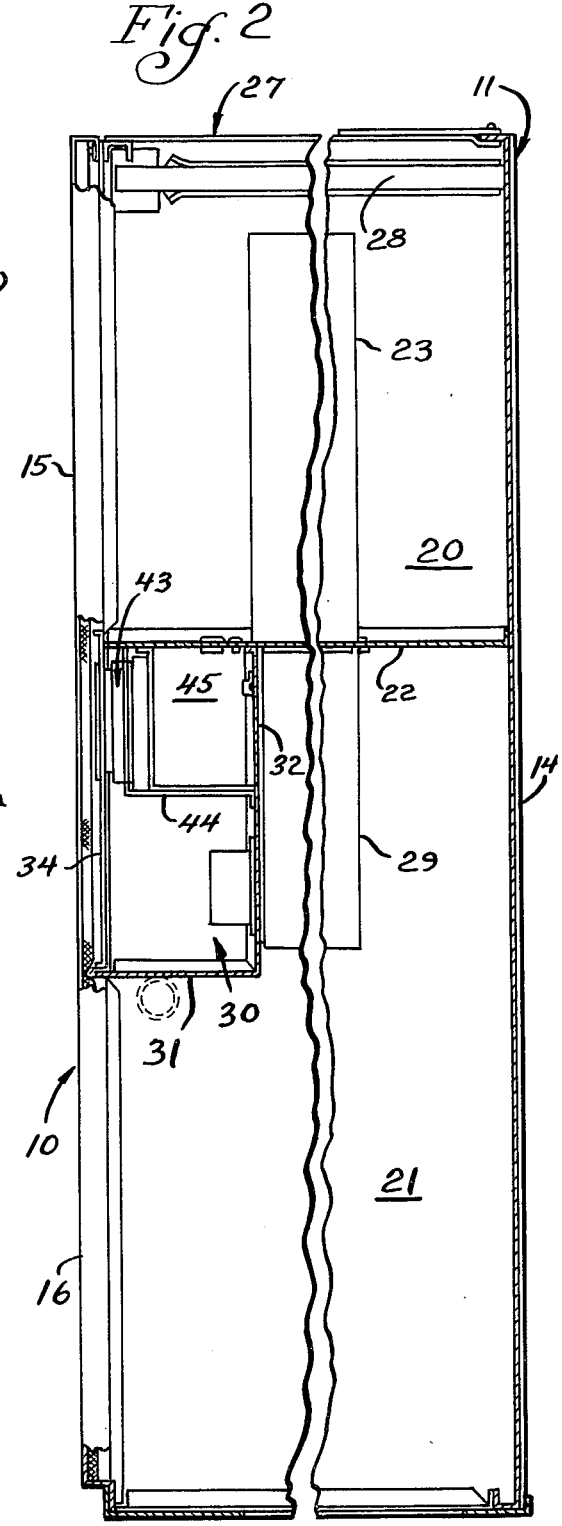

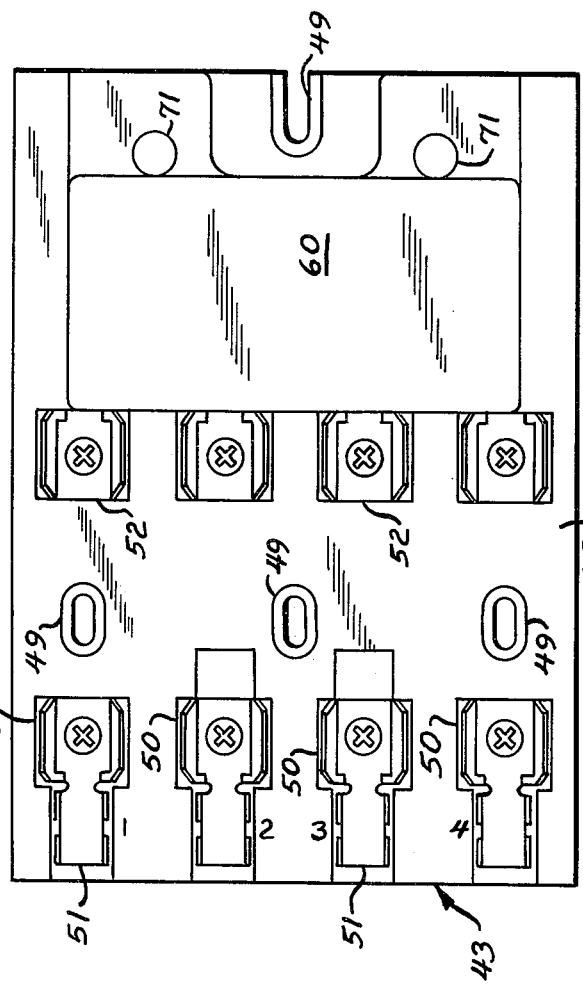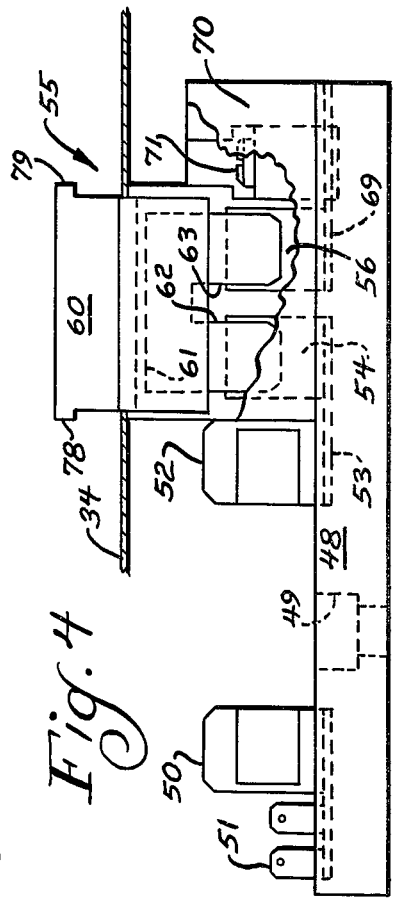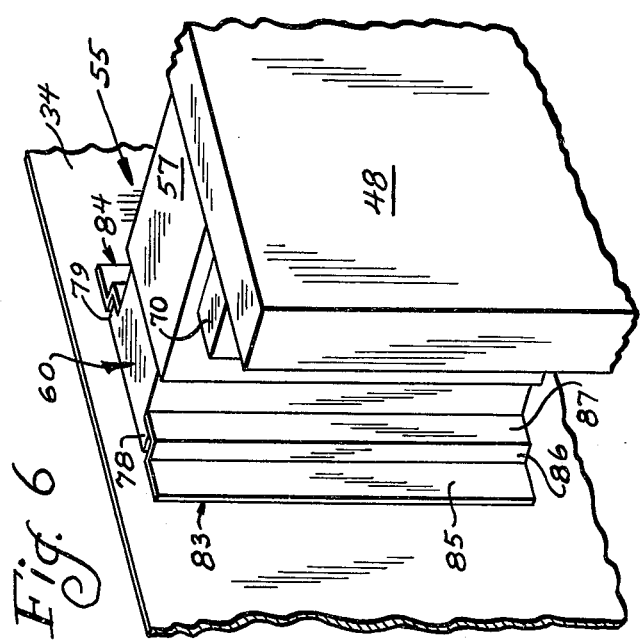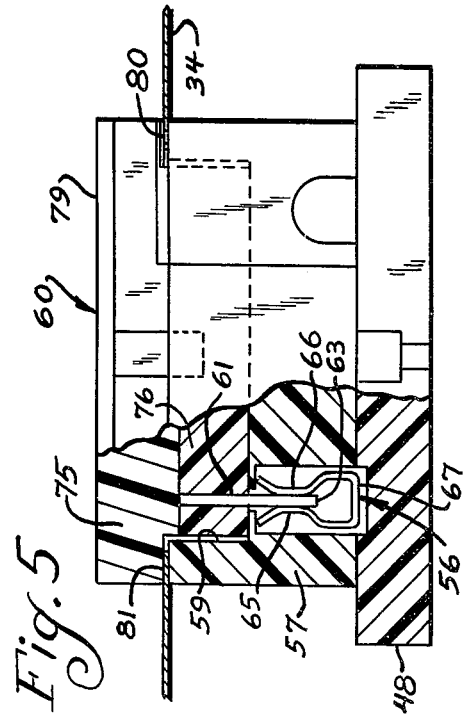

ELECTRIC FURNACE WITH INTERLOCKING DISCONNECT PANEL FOR ELECTRIC BOX

BACKGROUND AND SUMMARY

The present invention relates to an electric box which may be used, for example, on an electric furnace. The electric box is provided with a disconnect feature, such that the box cannot be opened for inspection or service without disconnecting the electricity from the furnace coils and other controls housed within the box. However, after opening the box, a maintenance man may replace the plug for servicing.

In the present invention, an electrical forced-air furnace is provided with a recess in the furnace body forming the electric box. An electric disconnect block is mounted in the box, as are other furnace controls, fuses, wires, etc.

The electric box is formed partially, at least, by the sheet metal panels forming the walls of the furnace, and it is provided with a cover panel conforming to one of the side walls of the furnace and fully enclosing the electric box when assembled thereto. The cover panel may be hinged, if desired.

The electric disconnect block is provided with fuse holders through which incoming electrical power is routed, and a main disconnect switch. The disconnect switch includes sets of female connector terminals mounted in the block and electrically isolated from one another. One set of terminals is connected to the fuse holders from which power is fed to the furnace coils; and the other set is connected to a power input connector.

The main disconnect switch also includes a removable plug which, in the preferred embodiment, extends through an aperture in the cover panel of the electric box, when assembled, to establish electric continuity between the female connector portions of the disconnect switch. In this embodiment, the body of the disconnect plug includes side shoulder portions which extend beyond the cover panel aperture to form an interlock, whereby the cover panel of the electric box cannot be removed without first removing the disconnect plug, thereby shutting power off from the controls and the heater coils, prior to inspection or servicing.

In an alternate embodiment, the plug is received and held by a vertical support channel in the cover panel such that when the panel is opened, the plug is disconnected; and only then may the plug be removed from the support channel.

There is thus provided a safety disconnect for an electric furnace which prevents access into the electric box housing the electric controls and wires which de-energizes these controls and the heater elements before servicing or maintenance is performed. A seasoned maintenance man, on the other hand, will have had experience with such furnaces and realize that caution must be observed in servicing. Hence, the service man may take the disconnect plug from the cover panel after it is opened and insert it into the disconnect body, thereby reenergizing the controls for performing servicing or maintenance functions.

Other features and advantages will be apparent to persons skilled in the art from the following detailed description of a preferred embodiment accompanied by the attached drawing wherein identical reference numerals will refer to like parts in their various views.

THE DRAWING

FIG. 1 is a front elevation view of a furnace incorporating the present invention with the cover panel removed;

FIG. 2 is a side view of the furnace of FIG. 1, partially shown in cross section and having the central portion broken away and removed;

FIG. 3 is a plan view of a disconnect block assembly;

FIG. 4 is a side view of the disconnect block assembly, partially broken away, and with the disconnect plug and cover panel in assembled relation;

FIG. 5 is a view similar to FIG. 4, partially broken away and shown in cross section, but taken at 90 degrees relative to the sight line of FIG. 4; and FIG. 6 is a three-quarters upper perspective of an alternate embodiment incorporating the invention, with portions cut away.

DETAILED DESCRIPTION

Referring then to FIGS. 1 and 2, reference numeral 10 generally designates a forced-air electric furnace including a sheet metal housing generally designated 11. The housing 11 includes first and second side panels 12, 13 (FIG. 1), a back panel 14 and a front panel comprising an upper section 15 and a lower section 16 (FIG. 2).

The furnace 10 is divided into an upper or intake section 20 and a lower or distribution section 21 by means of a horizontal mounting plate 22. A conventional blower 23 of the scroll type is housed in the upper section 20 and supported by the mounting plate 22. Air enters the blower 23 through the top of the furnace generally designated 27 and after passing through a filter element 28.

The air from the blower 23 is then forced into a housing 29 for the electric heating elements. The heated air then enters the lower section 21 and it may be distributed to the room through the lower section 16 of the front panel, or it may enter suitable ductwork if desired.

Still referring to FIGS. 1 and 2, a recess in the front of the furnace forms an electric box 30 which is located immediately to the front of the housing 29 for the electric elements. The electric box 30 includes a lower wall 31, a rear wall 32, and a removable cover panel 34. The top of the box 30 is provided by the mounting plate 22, and the sides are provided respectively by the side panels 12, 13 of the furnace, which, as best seen in FIG. 1, are turned inwardly to form flanges 12a and 13a to cooperate with the cover panel 34 enclosing the electric box 30.

To hinge the panel 34, the flange 12a is provided with three vertically spaced pairs of laterally spaced apertures as at 37, and the cover panel 34 is provided with a formed loop at each location of a pair of apertures which fits through the apertures and enables the cover panel 34 to pivot about the portion separating the apertures.

Thus, the electric box 30 is a fully enclosed recess within the furnace end, and it includes a cover panel which may be opened for access. As will be discussed in more detail presently, the cover panel in its closed position is interlocked with a manually operated main disconnect switch such that the cover panel cannot be opened without first disconnecting the switch and thereby de-energizing control elements within the box 30 and heater elements within the mounting 29. Alternatively, the cover panel 34 may be completely removable from the electric box, as persons skilled in the art will readily appreciate.

As mentioned, various control elements are mounted within the electric box 30, such as conventional sequencers as at 40, and bimetal temperature limit switches as at 41. There are four such limit switches, one for each heating element within the housing 29.

Also mounted within the electric box 30 is a fuse and disconnect assembly generally designated by reference numeral 43; and as seen in FIG. 2, it is mounted to a sheet metal support bracket 44 at a location adjacent the cover panel 34, and spaced from the rear wall 32 of the electric box 30 to form a space 45 which may be used as a conduit for routing wires, if desired. Since the electric box 30 is otherwise fully enclosed, however, the internal wiring need not have any special enclosed conduits.

Turning now to FIGS. 3–5, the fuse and disconnect assembly 43 may be seen in greater detail. It includes a base 48 made of electrically insulating material which is secured in a conventional manner to the bracket 44, for example, by using sheet metal screws fitting through the slots 49. Conventional fuse holder clips 50 are secured to the base 48, and each includes a terminal portion 51 to which outgoing electrical distribution wires may be connected. A corresponding fuse clip 52 is associated with each of the clips 50, each pair cooperating to hold a single conventional fuse.

As best seen in FIG. 4, the fuse clips 52 are connected electrically by means of a connective member 53 to a first female portion 54 of a manually operated disconnect switch generally designated 55. The first female portion 54 as well as a second female portion 56 of the main disconnect switch are located within an intermediate body portion 57 which is an integral part of the base 48, as best seen in FIG. 5.

The intermediate body portion 57 of the disconnect assembly includes a central recess 59 which receives a removable plug generally designated 60. The plug 60 includes two male connectors, one of which is shown in the drawing and designated 61. A second male connector is provided, similar to that which is shown, but it is not shown. Similarly, a second pair of female connectors similar to those shown at 54, 56 are provided and associated with the unseen second male connector. Obviously, through the selection of suitable dimensions, as many connecting pairs of female/male connectors may be provided as is desired or required, from one on up.

Returning now to the male connector 61, it may be a strip of copper, for example, ⅛ in. thick, formed in the shape of a C turned on its side, as seen in FIG. 4, and it includes first and second contactor portions 62, 63, for connecting respectively with the female contacts 54, 56. When the plug 60 is assembled to the intermediate body portion 57 of the disconnect assembly, electrical continuity is established between the female connectors 54, 56 by means of the male connector 61. The shape of the female contacts is best seen in FIG. 5 as having a general shape of a bottle with an opening neck for guiding the contact extension 63 into contacting relation with opposing neck portions 65, 66 which are urged together and into good electrical contact with the male connector by spring action of the connecting web 67. The over portion of the web 67 is connected by means of a conductive member 69 (FIG. 4) to a power input terminal or contact 70 to which the power feedin wires may be attached by means of a screw 71.

Referring now particularly to FIGS. 4 and 5, the plug 60 includes an outer segment 75 and an inner segment 76. The inner segment 76 serves as a support in which the male contacts 61 are embedded, and it fits into the recess 59 of the intermediate body member 57 of the disconnect assembly, seating on the lower portion of that recess when fully inserted. The outer portion 75 of the plug 60 (see FIG. 3) is rectangular in shape, having a longer dimension extending vertically in the illustrated embodiment. The peripheral edges of the outer section 75 of the plug 60 are provided with ridges 78, 79 in FIG. 4 to facilitate grasping by the fingers in removing the plug. It will be observed that the ridges 78, 79 are spaced outwardly of the cover panel 34 in the fully assembled or closed position shown in FIG. 4.

Referring now to FIG. 5, the shorter or horizontal edges of the plug 60 are provided with shoulders 80, 81 which, in the assembled position, are spaced from the intermediate body member 57 only a sufficient distance to permit the cover panel 34 to be interposed between them. Thus, in the assembled condition, the shoulders 80, 81 prevent opening of the cover panel 34.

It will be observed that in the illustrated embodiment, the aperture in the cover panel 34 has a width equal to the shorter transverse dimension of the plug 60 (FIGS. 3 and 4) and a length which is less than the longer dimension of the plug 60 (FIGS. 3 and 5). This, of course is not necessary to the practice of the invention, but only part of the illustrated embodiment.

Turning now to an alternative embodiment, partially illustrated in FIG. 6 from an upper three-quarters rear perspective, 34 again designates the cover panel which may be similar to that already described except that it need not be provided with an aperture, as will be clear presently. Reference numeral 48 again designates a base for the disconnect assembly, and 57 designates the intermediate body member in which the female portions of the main disconnect switch 55 are embedded.

The removable plug is again designated 60, and it is provided with outwardly extending side ridges 78, 79. However, the ridges 78, 79 are not intended for facilitating grasping by a hand; rather, they are held within angle-shaped retainer strips 83, 84 which are similar in function and complementary in shape. As seen in FIG. 6, the strip 83 includes a mounting portion 85 which may be welded or otherwise affixed to the interior surface of the cover panel 34, an outwardly extending portion 86, and an inwardly extending portion 87. The strip 83 is shaped to receive the ridge 78 on the plug 60; and it may be provided with a detent or other member at its lower portion to prevent the plug 60 from slipping all the way through the retainer strips. In other words, the plug 60 may be removed from the channels formed by the retainer strip, and when it is inserted, the male portions (not shown) of the plug are aligned with the female portions of the intermediate body 57. Thus, when the cover panel 34 is open, the plug 60 is removed and the main disconnect switch is opened. The plug 60 may then be removed upwardly from the channels formed by the retainer strips 83, 84 and replaced for further servicing or maintenance.

It will be appreciated that the present invention, although disclosed in the particular context of a furnace, applies more generally to any electrical heating-/cooling appliance. Having thus disclosed in detail a preferred embodiment, persons skilled in the art will be able to modify certain of the structure which has been illustrated and to substitute equivalent elements for those disclosed while continuing to practice the principle of the invention; and it is, therefore, intended, that all such modifications and substitutions be covered as they are embraced within the spirit and scope of the appended claims.

I claim:

1. In combination with an electric heating appliance having enclosing side walls, means housing electric heater coils, and blower means receiving room air for forcing the same over said coils, the improvement comprising: means integral with said appliance forming an electric box therein having a top wall, bottom wall, rear wall and first and second side walls, and defining an access aperture; a main disconnect switch including a base portion secured within said electric box and having at least one pair of spaced apart electrical contacts, and a plug removably assembled to said base and including a body portion and connecting means coupling said pair of contacts together when said plug is assembled to said base, said body portion including an inner section of reduced cross sectional area carrying said connecting means and an outer section of larger cross sectional area to define shoulder means spaced from said base in said assembled relation, said body portion further providing grip means on said outer section to facilitate removal of said plug; fuse holder means mounted on said base member of said disconnect assembly; and a removable cover panel covering said access aperture to close said electric box and defining an aperture slidably receiving said inner section of said plug and preventing insertion of said outer section, whereby said cover panel extends between said shoulder means of said removable plug and said base member when in assembled relation and said cover panel cannot be removed without first removing said plug and thereby disconnecting said switch.

2. The apparatus of claim 1 wherein said fuse holder means comprises a plurality of fuse holder mounted on said base member of said disconnect assembly, each fuse holder including a pair of clips, one of said clips being adapted to be connected to output wires and the other of said clips being electrically connected to one of said pair of contacts in said base; and input terminal means electrically connected to the other of said pair of contacts in said base.

3. The apparatus of claim 1 wherein said pair of contacts in said base comprise female contacts electrically isolated when said plug is not assembled thereto, and said connecting means in said plug comprises a pair of male contacts spaced to connect said female contacts together in electrical relation when assembled thereto.

4. The apparatus of claim 3 further comprising means pivotally mounting said cover panel to a side wall of said appliance.

5. The apparatus of claim 1 wherein said appliance comprises a furnace and said means forming said recess includes a separating wall separating the interior of said furnace to an upper portion housing and blower means and a lower portion housing said coils, sheet metal members forming said rear wall and said bottom wall, the sides of said furnace forming the side walls of said electric box.

6. In combination with an electric heating appliance having enclosing side walls, means housing electric heater coils, and blower means receiving room air for forcing the same over said coils, the improvement comprising: means integral with said appliance forming an electric box therein having a top wall, bottom wall, rear wall and first and second side walls, and defining an access aperture; a main disconnect switch including a base portion secured within said electric box and having at least one pair of spaced apart electrical contacts, and a plug removably assembled to said base and including connecting means coupling said pair of contacts together when said plug is assembled to said base and defining shoulder means spaced from said base in said assembled relation; and a removable cover panel covering said access aperture to close said electric box and defining means receiving and interlocking with said removable plug, said receiving means comprising vertical retainer strips fixed to the inner surface of said cover panel and defining side channels slidably receiving and holding said shoulders of said plug when said plug is assembled to said base while permitting removal of said plug longitudinally of said channels; whereby said cover panel cannot be removed without first removing said plug.

* * * * *